United States Patent [19]
Clubley et al.

[11] Patent Number: 5,160,630
[45] Date of Patent: Nov. 3, 1992

[54] SCALE INHIBITION

[75] Inventors: Brian G. Clubley, Wilmslow; Jan Rideout, Bolton, both of England

[73] Assignee: FMC Corporation, Philadelphia, Pa.

[21] Appl. No.: 764,040

[22] Filed: Sep. 23, 1991

[30] Foreign Application Priority Data

Sep. 29, 1990 [GB] United Kingdom ............... 9021261

[51] Int. Cl.$^5$ .............................................. C02F 5/10
[52] U.S. Cl. ................................. 210/699; 252/175; 252/180; 252/181; 252/389.2; 422/15; 210/700
[58] Field of Search ............... 210/699, 700; 252/180, 252/181, 175, 389.2; 422/15

[56] References Cited

U.S. PATENT DOCUMENTS

| | | |
|---|---|---|
| 2,957,931 | 10/1960 | Hamilton et al. |
| 4,029,577 | 6/1977 | Godlewski et al. ............... 210/699 |
| 4,046,707 | 9/1977 | Smith et al. ...................... 210/699 |
| 4,127,483 | 11/1978 | Smith et al. ...................... 210/699 |
| 4,159,946 | 7/1979 | Smith et al. ...................... 210/699 |
| 4,372,870 | 2/1983 | Snyder et al. .................... 210/699 |
| 4,374,733 | 2/1983 | Snyder et al. .................... 210/701 |
| 4,563,284 | 7/1986 | Amjad ............................. 210/699 |
| 4,681,686 | 7/1987 | Richardson et al. ............. 210/699 |

FOREIGN PATENT DOCUMENTS

| | | |
|---|---|---|
| 0071323 | 2/1983 | European Pat. Off. |
| 1474362 | 5/1977 | United Kingdom |
| 1539974 | 2/1979 | United Kingdom |

Primary Examiner—Stanley S. Silverman
Assistant Examiner—Neil McCarthy

[57] ABSTRACT

A method of inhibiting the precipitation of calcium carbonate scale from an aqueous system, comprising adding to the aqueous system, a compound having the formula I:

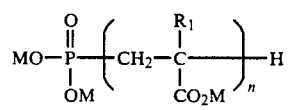

in which M is hydrogen or an alkali metal ion, an ammonium ion or a quaternized amine radical; $R_1$ is hydrogen or methyl; and n is an integer ranging from 1 to 10.

9 Claims, No Drawings

SCALE INHIBITION

The present invention relates to a method for inhibiting the precipitation of calcium carbonate scale from aqueous systems.

In U.S. Pat. No. 4,046,707 there is described a method of inhibiting the precipitation of scale-forming salts of calcium, magnesium, barium and strontium, from aqueous systems. The method comprises adding to the aqueous system, a minor proportion of a product comprising a telomeric compound of formula:

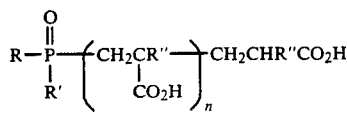

and salts thereof, in which R" is hydrogen, methyl or ethyl; R is hydrogen, $C_1$–$C_{18}$ alkyl, $C_5$–$C_{12}$ cycloalkyl, aryl, aralkyl, a residue of formula:

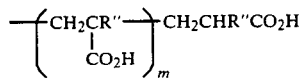

in which R" has its previous significance and the sum of m and n is an integer of at most 100, or R is a residue-OX, in which X is hydrogen or $C_1$–$C_4$ alkyl; and R' is a residue- OX in which X has its previous significance.

It will be apparent, therefore, that U.S. Pat. No. 4,046,707 is concerned with the inhibition of a wide range of different types of scale, and with a very broad scope of compounds to achieve the said inhibition of a disparate range of scales.

We have now found, unexpectedly, that when addressing the specific problem of the inhibition of calcium carbonate scale formation in aqueous systems, outstandingly good results are obtained when selecting a very narrow range of compounds which, although broadly envisaged within the scope of the compounds of U.S. Pat. No. 4,046,407 are not specifically mentioned therein, certainly not in relation to calcium carbonate scale inhibition, specifically.

Accordingly, the present invention provides a method of inhibiting the precipitation of calcium carbonate scale from an aqueous system, comprising adding to the aqueous system, a compound having the formula I:

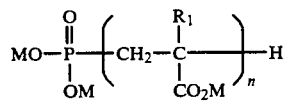

in which M is hydrogen or an alkali metal ion, an ammonium ion or a quaternised amine radical; $R_1$ is hydrogen or methyl; and n is an integer ranging from 1 to 10, preferably ranging from 4 to 10.

Alkali metal cations M are, principally, lithium, sodium and potassium ions; ammonium ions include, e.g. trimethylammonium, triethylammonium, bis(2-hydroxyethyl) ammonium, tris(2-hydroxyethyl) ammonium and bis(2-hydroxyethyl)-2-(hydroxy-3-p-nonylphenoxypropyl) ammonium ions; and quaternised amine radicals include those having the formula: $N^{\oplus}(R_aR_bR_cR_d)_4 An^{\ominus}$ in which $R_a$, $R_b$, $R_c$ and $R_d$ are the same or different, and each is $C_1$–$C_6$ alkyl, especially methyl or ethyl, or one of $R_a$, $R_b$, $R_c$ and $R_d$ is benzyl, and each of the other three of $R_a$, $R_b$, $R_c$ and $R_d$ is $C_1$–$C_6$ alkyl, especially methyl or ethyl; and $An^{\ominus}$ is a halide ion, especially chloride or bromide, or is hydroxyl or sulphate.

The compounds of formula I are known compounds, having been broadly described in U.S. Pat. No. 2,957,931 and, as already mentioned in U.S. Pat. No. 4,046,707.

The compounds of formula I may be produced by reacting the appropriate molar ratio of acrylic acid, methacrylic acid or $C_1$–$C_6$ alkyl ester thereof, depending upon the desired value of n, with one mole of a di-$C_1$–$C_4$ alkyl phosphite e.g. diethyl phosphite.

The reaction may be conveniently conducted in the presence of a polymerization initiator such as, but not limited to bisazobutyronitrile; organic peroxides such as benzoyl peroxide, methylethylketone peroxide, di-tertiarybutyl peroxide and mono-butyl hydroperoxide; or oxidizing agents such as hydrogen peroxide, sodium perborate or sodium persulphate.

At completion of the reaction between diethyl phosphite and the (meth) acrylic monomer, the crude reaction mixture may be purified, if desired, by conventional techniques. For example, any excess diethyl phosphite reactant may be removed by distillation of the reaction mixture. Moreover, any ester groupings on the (meth) acrylic moieties in the compounds of formula I may be converted into carboxyl functions by, e.g., acid hydrolysis. After, such acid hydrolysis, the hydrolyzed product may be evaporated to dryness, to provide solid material of formula I.

Salts of the compounds of formula I in which some or all of the acidic hydrogens M in the compounds of formula I have been replaced by alkali metal-ammonium- or quaternised amine cations, may be prepared by mixing an aqueous or alcoholic solution containing the requisite base, in an amount which may be more than, equal to or less than the stoichiometric requirement for full replacement of the acidic hydrogens. The solvent for the base may then be removed, e.g. by evaporation.

Many of the aqueous systems to be treated according to the method of the present invention are sufficiently basic that the system itself is adequate to effect neutralization, so that when adding the acidic form of the compound of formula I, it is converted in situ into an alkali metal version.

The amount of the compound of formula I, or salt thereof, used in the method according to the present invention may range e.g. from 1 to 200 ppm, preferably from 2 to 20 ppm, based on the weight of the aqueous system.

Aqueous systems which may be effectively treated according to the present invention include e.g. cooling water systems, steam generating systems, sea-water evaporators, reverse osmosis equipment, bottle washing plants, paper manufacturing equipment, sugar evaporator equipment, soil irrigation systems, hydrostatic cookers, gas scrubbing systems, closed circuit heating systems, aqueous-based refrigeration systems and downwell and topside systems.

The compounds of formula I may be used in the method of the present invention in conjunction with other materials known to be useful in water treatment.

Examples of further water treatment additives include one or more of corrosion inhibitors; metal deactivators; further scale inhibitors/dispersing agents;

threshold agents; precipitating agents; oxygen scavengers; sequestering agents; antifoaming agents; and biocides.

Corrosion inhibitors which may be used include water-soluble zinc salts; phosphates; polyphosphates; phosphonic acids or their salts, e.g. hydroxyethyl diphosphonic acid (HEDP), nitrilotris methylene phosphonic acid, methylamino dimethylene phosphonocarboxylic acids (e.g. those described in DE-OS 2632774), hydroxyphosphonoacetic acid, 2-phosphonobutane-1,2,4-tricarboxylic acid and those described in GB-PS 1572406; nitrates e.g. sodium nitrate; nitrites e.g. sodium nitrite; molybdates e.g. sodium molybdate; tungstates e.g. sodium tungstate; silicates e.g. sodium silicate; N-acylsarcosines; N-acylimino diacetic acids; ethanolamines; fatty amines; and polycarboxylic acids, e.g. polymaleic acid and polyacrylic acid (and their respective alkali metal salts), copolymers of maleic anhydride e.g. with sulphonated styrene, copolymers of acrylic acid e.g. with hydroxyalkylated acrylic acid, and substituted derivatives of polymaleic and polyacrylic acids and their copolymers.

Metal deactivators, especially for copper, include benzotriazole, bis-benzotriazole or copper-deactivating derivatives of benzotriazole or tolutriazole, or their Mannich base derivatives, or mercaptobenzotriazole.

Further scale inhibitors/dispersing agents include polymerised acrylic acid (or its salts), phosphinopolycarboxylic acids (e.g. those described in GB-PS 1458235), the cotelomers described in EP-PS 0150806, hydrolysed polyacrylonitrile, polymerized methacrylic acid and its salts, polyacrylamide and copolymers of acrylamide with acrylic and methacrylic acids, lignin sulphonic acid and its salts, tannin naphthalene sulphonic acid/formaldehyde condensation products, starch and its derivatives, cellulose, acrylic acid/lower alkyl hydroxy-acrylate copolymers (e.g. those described in U.S. Pat. No. 4,029,577), styrene/maleic anhydride copolymers and sulphonated styrene homopolymers (e.g. those described in U.S. Pat. No. 4,374,733), and combinations of these.

Specific threshold agents include 2-phosphonobutane-1,2,4-tri-carboxylic acid (PBTC), hydroxyethyl diphosphonic acid (HEDP), hydrolyzed polymaleic anhydride and its salts alkyl phosphonic acids, hydroxyphosphonoacetic acid, 1-amino-alkyl-1,1-diphosphonic acids and their salts, and alkali metal polyphosphates.

It will be clear from the above lists that certain additive compounds, e.g. phosphonocarboxylic acids, function both as scale inhibitors and as corrosion inhibitors.

Precipitating agent co-additives which may be used are alkali metal orthophophates or carbonates; oxygen scavengers include alkali metal sulphites and hydrazines; sequestering agents are nitrilotriacetic acid and its salts; antifoaming agents are silicones, e.g. polydimethylsiloxanes, distearyl sebacamide, distearyl adipamide and related products derived from ethylene oxide and/or propylene oxide condensations, in addition to fatty alcohols such as capryl alcohol and its ethylene oxide condensates. Biocides which may be used are, e.g., amines, quaternary ammonium compounds, m-chlorophenols, sulphur-containing compounds such as sulphones, methylene bis thiocyanates and carbamates, isothiazolones, brominated propionamides, triazines, phosphonium compounds, chlorine and chlorine-release agents, and organometallic compounds such as tributyl tin oxide.

Particularly interesting additive packages for use in the method of present invention are those comprising one or more compounds of formula I in combination with one or more co-additives selected from polymaleic acid or polyacrylic acid, or their copolymers or substituted copolymers; hydroxyphosphono-acetic acid; HEDP; PBTC; triazoles such as tolutriazole; molybdates; and nitrites.

The following Examples further illustrate the present invention. Examples A, B and C relate to the preparation of compounds of formula I for use in the method of the present invention.

EXAMPLE A

To 138 g of diethyl phosphite are added, separately, 100 g of ethyl acrylate and 15 grams of di-tert-butylperoxide, dropwise, over 4 hours with stirring, at 140° C. The temperature is maintained at 140° C. for a further 2 hours after the additions are complete. Unreacted di-ethyl phosphite is removed by distillation under reduced pressure, and the residual material is suspended in 400 g of 18% w/w hydrochloric acid, and the mixture heated under reflux conditions for 48 hours.

The resulting solution is evaporated to dryness under reduced pressure to give 68 g product (a yield of 94% based on acrylic acid). The product obtained has an $M_n=644$ and $M_\omega=941$ giving $M_\omega/M_n=1.46$. Microanalysis of the product gives value of 8.15% P; indicating an average value of integer n=4.

EXAMPLE B

Following the procedure used in Example A, from 55.2 g of diethylphosphite, 160 grams of ethyl acrylate and 15 grams of di-tert-butyl peroxide, there are obtained 124 g (108%) of product having $M_n=669$ and $M_w=1019$. Microanalysis of the product gives the value: 4.7% P; corresponding to an average value of integer n=8.

EXAMPLE C

Following the procedure used in Example A, from 55 g of dimethylphophite, 43 g of methyl acrylate and 7.5 g of di-tert-butyl peroxide, there are obtained 40 g (111%) of a product having $M_n=705$ and $M_w=1102$. Microanalysis of the product gives the value: 7.1% P, corresponding to an average value of integer n=5.

EXAMPLES 1 AND 2

Calcium carbonate (cooling water) threshold test

| conditions | |
| --- | --- |
| Temperature | 40° C. |
| Test Duration | 24 hours |
| Aeration | 1 litre/minute |
| Agitation | 150 rpm |
| Calcium | 300 ppm as $Ca^{2+}$ |
| Magnesium | 88 ppm as $Mg^{2+}$ |
| Carbonate | 102 ppm as $CO_3^{2-}$ |
| Bicarbonate | 538 ppm as $HCO_3^-$ |

This is a scale test in which the ability of an additive to inibit $CaCO_3$ can be measured over a period of time. The test water used simulates the type of water found in a cooling water system. Likewise, the temperature of the test water represents typical temperatures close to heat exchangers in cooling water systems. The severity of the test is increased by bubbling air through the system, and a constant mixture of particles in solution is enabled by agitating the test water.

500 mls of solution containing the above proportions of calcium chloride and magnesium chloride, are mixed with 500 mls of a solution containing the above proportions of sodium carbonate and sodium bicarbonate, which already contains the additive under test. Air is bubbled through the resulting solution at 1 liter/minute, and the mixed solution is held at 40° C. for 24 hours.

At time intervals of 3 hours, 50 mls of sample are removed from each test solution. The sample is filtered under suction, and calcium remaining in the filtrate is determined by EDTA titration.

$$\% \text{ Ca CO}_3 \text{ inhibition} = \frac{\text{titre of test} - \text{titre of blank}}{\text{titre of standard} - \text{titre of blank}} \times 100$$

The standard test solution contains 500 mls containing 11.0 g of Ca $Cl_2 2H_2O$ and 7.50 g/5 l of Mg $Cl_2 6H_2O$ and 500 mls distilled water. The blank test solution contains 500 ml of the standard test solution and 500 ml containing 1.80 g/5l $Na_2CO_3$ and 7.40 g/5l $NaHCO_3$.

The results are summarised in the following Table 1.

TABLE 1

| Example | Additive (2 ppm) | % inhibition at 3 hours |
|---|---|---|
| 1 | Product of Example A | 99 |
| 2 | Product of Example B | 99 |

EXAMPLES 3 TO 5

Threshold Test for Calcium Carbonate

The following solutions (a), (b), and (c) are prepared:
a) Calcium nitrate solution
1.470 grams of calcium nitrate tetrahydrate are dissolved in de-ionised water and the solution is made up to 1 liter;
b) Sodium carbonate solution
0.646 gram of sodium carbonate is dissolved in de-ionised water and the solution is made up to 1 liter.
c) Solution of test compound
The test compound, as obtained in Example A, B, or C is dissolved in water to give a solution containing 1000 ppm of active ingredient.

50 mls of the calcium nitrate solution are placed in a 120 g glass bottle fitted with a screw cap. To this solution is added that volume of solution (c) required to produce a concentration of test compound of 10 ppm in the final volume (100 ml) of test solution (viz 1.0 ml of 0.1% of solution (c) produces a concentration of 10 ppm of test compound in the test solution).

50 mls of solution (b) are added and the mixture is shaken. The test solution is stored in a constant temperature bath, maintained at 25° C., for 24 hours.

40 mls of the test solution are withdrawn, a crystal of Patton and Reeder's Reagent (2-hydroxy-1-(2-hydroxy-4-sulpho-1-naphthylazo)-3-naphthoic acid) is added, followed by two pellets of sodium hydroxide. The resulting solution is titrated with a standard 0.01M solution of ethylene-diamine tetra-acetic acid di-sodium salt.

The results, as set out in the following Table 2, are expressed as % inhibition of precipitation of calcium carbonate relative to a blank titre (i.e. one containing no test compound).

$$\% \text{ inhibition} = \frac{(\text{Titre} - \text{blank titre})}{(\text{standard titre} - \text{blank titre})} \times 100$$

TABLE 2

| Example | Additive (10 ppm) | % Inhibition of precipration |
|---|---|---|
| 3 | Product of Example A | 98% |
| 4 | Product of Example B | 100% |
| 5 | Product of Example C | 100% |

EXAMPLES 6 TO 8

Threshold Test for Calcium Carbonate

The following solutions (a), (b) and (c) are prepared.
a) 11 grams of calcium chloride dihydrate and 0.75 gram of magnesium chloride hexahydrate are dissolved in distilled water and the solution is made up to 1 liter.
b) 0.18 gram of sodium carbonate and 0.74 gram of sodium bicarbonate are dissolved in distilled water and the solution is made up to 1 liter.
c) The test compound, as obtained in Example A, B or C is dissolved in water to give a solution containing 1000 ppm of active ingredient.

50 mls of solution (a) are placed in a 113 g glass bottle. To this solution is added that volume of solution (c) requried to produce a concentration of test compound of 2 ppm in the final volume (100 ml) of test solution (viz 0.2 ml of solution (c) produces a concentration of 2 ppm of test compound in the test solution).

50 mls of solution (b) are added and the solutions are mixed. The test solution is stored in a constant temperature bath at 70° C. for 30 minutes. Air is bubbled through the solutions at 0.5 liter/minute per test bottle.

40 mls of the test solution are withdrawn, filtered, a crystal of Patton and Reeder's Reagent (2-hydroxy-1-(2-hydroxy-4-sulpho-1-naphthylazo)-3-naphthoic acid) is added, followed by two pellets of sodium hydroxide. The resulting solution is titrated with a standard 0.01M solution of ethylene-diamine tetra-acetic acid di-sodium salt.

The results, set out in the following Table 3, are expressed as % inhibition of precipitation of calcium carbonate relative to a blank titre (i.e. one containing no test compound).

$$\% \text{ Inhibition} = \left[ \frac{\text{Titre} - \text{blank titre}}{\text{Standard titre} - \text{blank titre}} \right] \times 100$$

TABLE 3

| Example | Additive (2 ppm) | % Inhibition of precipration |
|---|---|---|
| 6 | Product of Example A | 100% |
| 7 | Product of Example B | 97.9% |
| 8 | Product of Example C | 96.0% |

EXAMPLES 9 TO 11

Calcium Sequestration Test

TABLE 3

| Example | Additive (2 ppm) | % Inhibition of precipration |
|---|---|---|
| 6 | Product of Example A | 100% |
| 7 | Product of Example B | 97.9% |

TABLE 3-continued

| Example | Additive (2 ppm) | % Inhibition of precipation |
| --- | --- | --- |
| 8 | Product of Example C | 96.0% |

This test determines the ability of an additive to sequester calcium in the presence of bicarbonate ions at constant temperature and pH.

The following solutions a, b, c and d are prepared:
solution a: 3.36 g of sodium hydrogencarbonate dissolved in 1 liter of distilled water
solution b: 100 ppm (active ingredient) additive solution
solution c: 0.1M sodium hydroxide solution
solution d: 3.672 g of calcium chloride dihydrate dissolved in 1 liter of distilled water 25 cm³ of solution a) are mixed with 2 cm³ of solution b) and diluted to 100 cm³ with distilled water. 50 cm³ of this solution are pipetted into the titration cell which contains a thermometer, pH-electrode and photometer measuring cell.

The stirrer and hot plate are switched on. The temperature of the solution is set to 40° C. and maintained with a temperature controller. About 15 minutes are allowed for temperature equilibration to 40° C.

The titration with solution d) is carried out under the following conditions:
i) the pH is set to 9 and controlled with a pH stat or by delivering appropriate amounts of solution c) when required.
ii) the wavelength on the photometer is set at 420 nm and the turbidity monitored on a chart recorder.
iii) solution d) is delivered at 0.2 cm³/min.

The trace from the chart recorder is a turbidity versus time graph. The point at which the trace 'breaks' is the end point of the titration.

The amount of calcium sequestered is calculated from the following equation:

$$\text{ppm CaCO}_3 \text{ sequestered} = V \times 2.5 \times 20$$

(as CaCO₃)
where V
= volume of solution d required to reach the end point 2.5
= conversion factor from ppm Ca²⁺ as ion to ppm of Ca²⁺ as CaCO₃
= conversion factor to a 1 liter solution. The results are set out in Table 4.

TABLE 4

| Example | Additive (2 ppm) | ppm Ca (as CaCO₃) |
| --- | --- | --- |
| 9 | Product of Example A | 410 |
| 10 | Product of Example B | 314 |
| 11 | Product of Example C | 303 |

We claim:

1. A method of inhibiting the precipitation of calcium carbonate scale from an aqueous system, comprising adding to the aqueous system, a compound having the formula I:

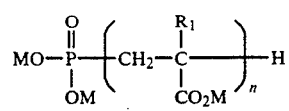

in which M is hydrogen or an alkali metal ion, an ammonium ion or a quaternised amine radical; $R_1$ is hydrogen or methyl; and n is an integer ranging from 1 to 10.

2. A method according to claim 1 in which n is an integer ranging from 4 to 10.

3. A method according to claim 1 in which each M is hydrogen.

4. A method according to claim 1 in which $R_1$ is hydrogen.

5. A method according to claim 1 in which the amount of the compound of formula I, or salt thereof, added to the aqueous system is within the range of from 1 to 200 ppm, based on the weight of the aqueous system.

6. A method according to claim 5 in which the amount of the compound of formula I, or salt thereof, added to the aqueous system is within the range of from 2 to 20 ppm, based on the weight of the aqueous system.

7. A method according to claim 1 in which the aqueous system treated is selected from the group consisting of a cooling water system, a steam generating system, the aqueous system of a sea-water evaporator, the aqueous system of reverse omosis equipment, the aqueous system of bottle washing plants, the aqueous system of paper manufacturing equipment, the aqueous system of sugar evaporator equipment, a soil irrigation system, the aqueous system of hydrostatic cookers, the aqueous system of a gas scrubbing system, an aqueous closed-circuit heating system, an aqueous-based refrigeration system, an aqueous topside system or an aqueous downwell system.

8. A method according to claim 1 in which the compound of formula I, or salt thereof, is used in combination with at least one material selected from the group consisting of a corrosion inhibitor, a metal deactivator, a further scale inhibitor/dispersing agent, a threshold agent, an oxygen scavenger, a sequestering agent, an antifoaming agent and a biocide.

9. A method according to claim 8 in which the material is selected from the group consisting of polymaleic acid, polyacrylic acid, their copolymers and substituted copolymers; hydroxyphosphonoacetic acid; hydroxyethyl diphosphonic acid; 2-phosphonobutane-1,2,4-tricarboxylic acid; tolutriazole; a molybdate; and a nitrite.

* * * * *

UNITED STATES PATENT AND TRADEMARK OFFICE
CERTIFICATE OF CORRECTION

PATENT NO. : 5,160,630

DATED : November 3, 1992

INVENTOR(S) : Brian George Clubley and Jan Rideout

It is certified that error appears in the above-identified patent and that said Letters Patent is hereby corrected as shown below:

Column 6, lines 65 thru Column 7, lines 1-5, at the second appearance of

" Table 3 "

| Example | Additive (2ppm) | % Inhibition of precipitation |
|---------|-----------------|-------------------------------|
| 6 | Product of Example A | 100% |
| 7 | Product of Example B | 97.9% |
| 8 | Product of Example C | 96.0% | should be deleted and substituted with

--Conditions

| | |
|---|---|
| Temperature | 40°C |
| pH | 9 |
| Stirrer spread set at | 4 |
| Chart reader speed | 30cm/hr |
| Titration rate with 1000 ppm $Ca^{2}$ ion solution | $0.2 cm^{3}/min$ |

UNITED STATES PATENT AND TRADEMARK OFFICE
CERTIFICATE OF CORRECTION

PATENT NO. : 5,160,630
DATED : November 3, 1992
INVENTOR(S) : Brian George Clubley, et. al.

It is certified that error appears in the above-indentified patent and that said Letters Patent is hereby corrected as shown below:

Wavelength set on photometer        420nm--.

Signed and Sealed this

Ninth Day of November, 1993

*Attest:*

BRUCE LEHMAN

*Attesting Officer*       *Commissioner of Patents and Trademarks*